United States Patent [19]

Taylor et al.

[11] 3,765,300

[45] Oct. 16, 1973

[54] DENSE CARBIDE COMPOSITE FOR ARMOR AND ABRASIVES

[75] Inventors: Kenneth M. Taylor, Niagara Falls, N.Y.; Richard J. Palicka, Youngstown, N.Y.

[73] Assignee: The Carborundum Company, Niagara Falls, N.Y.

[22] Filed: May 22, 1967

[21] Appl. No.: 640,327

[52] U.S. Cl.............. 89/36 A, 106/44, 29/182.7, 161/404, 109/82, 51/307
[51] Int. Cl............................................. F41h 5/00
[58] Field of Search.................. 109/82; 161/404; 89/36 A; 106/44; 29/182.7; 51/307

[56] References Cited
UNITED STATES PATENTS

| | | | |
|---|---|---|---|
| 1,703,416 | 2/1929 | Donaldson | 109/82 W X |
| 2,108,794 | 2/1938 | Boyer et al. | 106/44 |
| 2,109,246 | 2/1938 | Boyer et al. | 106/44 |
| 2,908,553 | 10/1959 | Frank et al. | 106/44 X |
| 3,035,325 | 5/1962 | Nicholson et al. | 264/29 |
| 3,178,807 | 4/1965 | Bergmann | 29/182.7 |
| 3,205,841 | 9/1965 | Shwayder | 109/82 |

FOREIGN PATENTS OR APPLICATIONS 1,213,305  3/1966  Germany ............................ 89/36 A

OTHER PUBLICATIONS

Refractory Hard Metals, Schwarzkopf et al., The MacMillan Co., New York, 1953.

*Primary Examiner*—Stephen J. Lechert, Jr.
*Attorney*—K. W. Brownell

[57] ABSTRACT

Hard, dense, composite ceramic bodies of boron carbide, silicon carbide and silicon, particularly useful as ceramic armor, are produced by forming a mixture of granular boron carbide and a temporary binder into a desired shape and setting the binder to obtain a coherent green body which is siliconized by heating it, in an inert atmosphere and in contact with a controlled amount of silicon, to a temperature above the melting point of silicon and in the range of about 1500°–2200°C, whereupon the molten silicon infiltrates the body and reacts with some of the boron carbide thereof.

8 Claims, No Drawings

DENSE CARBIDE COMPOSITE FOR ARMOR AND ABRASIVES

BACKGROUND OF THE INVENTION

This invention relates to hard, dense, composite ceramic bodies of boron carbide silicon carbide and silicon; to methods of making such bodies; and to such hard, dense boron carbide-silicon carbide-silicon composite bodies which are particularly useful as armor.

There has been considerable effort devoted in recent years to the development of ceramic armor materials which are sufficiently strong to afford adequate protection against projectiles but which at the same time are light enough to be useful in such applications as personnel and aircraft armor, where it is important that the weight of the amount of armor required for protection be at a minimum or at least within practical limits. It is also important that the processes employed in making ceramic armor materials be adaptable to the production of armor in rather intricate monolithic shapes such as helmets, vest sections, leg armor sections and the like.

Several comparatively lightweight ceramic materials have been reported as useful for armor: sintered alumina; self-bonded silicon carbide; and hot pressed boron carbide. Of these, the alumina and silicon carbide materials may be made by processes which permit the formation of various shapes, but they have relatively high specific gravities of the order of 3.65 and 3.05, respectively, and effective amounts of these materials are comparatively heavy. Hot pressed boron carbide, on the other hand, has a relatively low specific gravity of about 2.45–2.5, but the nature of a hot pressing process is such as to render it difficult, if not impossible, to form shapes other than flat plates and other relatively simple shapes. Moreover, hot pressing is a particularly expensive process and is not well suited to large scale production by continuous processing.

SUMMARY OF THE INVENTION

The present invention contemplates a hard, dense (i.e. essentially nonporous) composite ceramic material consisting essentially of boron carbide, silicon carbide and silicon, which has a relatively low specific gravity approaching that of hot pressed boron carbide, but which may be produced without resort to hot pressing by an economical method which lends itself readily to the production of bodies of various shapes. Accordingly, composite bodies may be produced in accordance with this invention which are especially useful as ceramic armor. Such composite bodies may be quite suitable as armor for protection against low caliber, low velocity projectiles, even if they lack the optimum properties required for protection against high caliber, high velocity projectiles. Composite bodies may also be prepared which, even if not especially useful as armor, nonetheless have desirable properties such as hardness, wear resistance, strength and lack of porosity which render such bodies, in suitable shapes, useful as extrusion dies, sandblast nozzles, suction box covers for paper-making machines, buoyancy spheres and the like.

Briefly, the process of the invention comprises preparing an initial mixture of granular boron carbide and a temporary binder; forming the initial mixture into a desired shape by pressing, extruding, investment or slip casting or any other suitable method; setting the temporary binder to impart sufficient coherence to the shaped green body to permit further processing; and siliconizing the coherent green body by heating it, in an inert atmosphere which preferably is a vacuum and in contact with a controlled amount of silicon, to a siliconizing temperature above the melting point of silicon and at least about 1500°C but below about 2200°C. Thereupon, the molten silicon infiltrates the body and undergoes a rather complex reaction with some of the boron carbide, producing some silicon carbide in situ; and to the extent that interstices exits in the body between the remaining boron carbide and the newly-formed silicon carbide, the interstitial space is permeated by free silicon.

DESCRIPTION OF PREFERRED EMBODIMENTS

The invention will now be described in detail and certain preferred features will be pointed out, partly with reference to the examples which follow and which are intended to illustrate and not to limit the inventive concepts.

EXAMPLE 1

A mixture of granular boron carbide of various grit sizes is prepared consisting of 45 parts of 180 grit, 25 parts of 400 grit and 30 parts of 800 grit. Thereto is added 10 parts of an aqueous solution containing 10 percent polyvinyl alcohol as a temporary binder, and the mixture is blended until substantially homogeneous. The resulting mixture, or initial mixture, is screened through a coarse sieve to break up any agglomerates. A 510 g quantity of the mix is placed in a steel mold 6.4 inches square (16.3 cm square) and pressed at 2700 psi (190 kg/sq cm) to form a plate 6.4 inches square by 0.44 inch (1.12 cm) thick. The piece is removed from the mold, placed in an oven at room temperature and heated to 105°C over a period of about 30 hours at a substantially constant rate of temperature increase to evaporate the water and set the polyvinyl alcohol binder. The coherent green body thus obtained has a specific gravity of 1.55.

The green body is placed on a 7 inch square (17.7 cm square) piece of loosely woven carbide cloth in the bottom of a dense graphite crucible which is placed in a container disposed within the coils of an induction furnace. A 360 g quantity of granular silicon is carefully placed on top of the green body to form a pile of generally pyramidal shape with the base of the pile extending near the edges of the body.

The container is evacuated to a pressure of about 50 microns to provide an inert atmosphere, and the power source to the induction coils is turned on. The reduced pressure is maintained throughout the heating cycle. An optical pyrometer sighted on the piece is used to ascertain the temperature of the piece as the temperature rises. At a temperature of about 1400°C the silicon melts, spreading out over the top of the piece; and when a temperature of about 1600 °C is reached, after a total heating time of about 1.75 hours, the molten silicon infiltrates the piece quite abruptly and reacts with some of the boron carbide to produce silicon carbide. Thereupon, the power is immediately turned off and the furnace and its contents are allowed to cool to room temperature.

The ceramic plate thus produced has a specific gravity of 2.54, a modulus of rupture of 25,000 psi (1750 kg/sq cm) and a modulus of elasticity of 49 × 10$^6$ psi (3.4 × 10$^6$ kg/sq cm), and is extremely hard and essentially nonporous. Anal.: total C, 14.18 percent; total Si, 41.79 percent; total B (diff.), 44.03 percent; free C, 0.07 percent; free Si, 21.42 percent. X-ray diffraction analysis indicates that the body consists of the following phases: a first boron carbide type, with a diffraction pattern corresponding to normal $B_4C$; a second boron carbide type, with a diffraction pattern of boron carbide having an expanded lattice; alpha (hexagonal) silicon carbide; beta (cubic) silicon carbide; and silicon.

The polyvinyl alcohol employed as the binder in Example 1 is dissipated during the siliconizing heating cycle, prior to the time that the silicon melts, leaving no significant amount of carbon residue in the body at the time the silicon infiltrates the body. For reasons which will be discussed hereinafter, however, it is often desired to have a certain amount of finely divided carbon present in the body at the time of siliconization, in which case the silicon reacts not only with some of the boron carbide in the body, but with substantially all of the carbon, thus producing silicon carbide from both of these carbon sources. One method of producing a body to be siliconized which contains carbon is to employ a temporary binder which is carbonizable, i.e. which will produce a carbon residue in the body upon heating. This method is illustrated in Examples 2 and 3. Alternatively, a quantity of finely divided carbon of any suitable variety such as powdered graphite may be incorporated in the initial mixture. It is usually preferred, however, when the presence of carbon is desired in the body to be siliconized, to adopt both of the foregoing methods by incorporating carbon and a carbonizable binder in the initial mixture, as in Examples 4 and 5.

EXAMPLE 2

A mixture of granular boron carbide of various grit sizes is prepared consisting of 42 parts of 120 grit, 23 parts of 180 grit, 14 parts of 400 grit and 14 parts of 800 grit. Thereto is added 7 parts of a temporary carbonizable binder consisting of 53 percent of a liquid phenol-formaldehyde resin of the kind typified by that sold by Varcum Chemical Division of Reichhold Chemicals, Inc. under the trade name Varcum 8121 and 47 percent of furfural as a diluent therefor. The mixture is blended until substantially homogeneous and screened through a coarse sieve to break up any agglomerates.

A 495 g quantity of the screened mix is pressed at 3000 psi (210 kg/sq cm) to form a plate of the same dimensions as that prepared in Example 1. The piece is placed in an oven at room temperature and heated to 150 °C over a period of about 24 hours at a substantially constant rate of temperature rise of about 5°C/hr, to set and cure the resin, the resulting green body having a specific gravity of 1.58.

The body is then siliconized under substantially the same conditions and in the same manner as described in Example 1, employing 295 g of silicon and a vacuum of about 50 microns. As the temperature rises, but before the silicon melts, the binder carbonizes to produce carbon distributed throughout the body, the amount of this residual carbon being about 35–40 percent of the weight of the resin incorporated in the initial mixture. Upon infiltration of the piece by the molten silicon, the silicon reacts with the residual carbon, as well as with some of the boron carbide, to produce silicon carbide.

The ceramic plate, or tile, thus produced has a specific gravity of 2.55, a modulus of rupture of 25,300 psi (1770 kg/sq cm), and a modulus of elasticity of 49.5 × $10^6$ psi (3.5 × $10^6$ kg/sq cm), and is extremely hard and essentially nonporous. Anal.: total C, 14.0 percent; total Si, 32.2 percent; total B (diff.), 53.8 percent; free C, 0.18 percent; free Si, 21.0 percent.

EXAMPLE 3

A mixture of granular boron carbide is prepared consisting of 18.7 parts of 16 grit, 23.4 parts of 36 grit, 11.7 parts of 54 grit, 11.7 parts of 70 grit, 18.7 parts of 180 grit and 9.3 parts of 400 grit. Thereto is added 6.5 parts of the same carbonizable binder employed in Example 2 and the mixture is blended until substantially homogeneous and screened through a coarse sieve to break up any agglomerates. Substantially the same procedure and conditions as in Example 2 are employed to prepare and siliconize a green body from 520 g of the mix, 300 g of silicon being used. The resulting plate, of the same dimensions as that prepared in Example 2, has a specific gravity of 2.51, a modulus of rupture of 12,000 psi (840 kg/sq cm) and a modulus of elasticity of 44.5 × $10^6$ psi (3.1 × $10^6$ kg/sq cm), and is extremely hard and essentially nonporous. Anal.: total C, 15.2 percent; total Si, 35.3 percent; total B (diff.), 49.5 percent, free C, 0.35 percent; free Si, 20.0 percent.

EXAMPLE 4

A mixture is prepared consisting of 45 parts of 120 grit boron carbide, 23 parts of 180 grit boron carbide, 30 parts of 800 grit boron carbide, 2 parts of powdered graphite with a particle size of about 50 microns and smaller, and 9 parts of a carbonizable binder consisting of 46 percent of a phenol-formaldehyde resin such as that used in Example 2 and 54 percent of furfural as a diluent therefor. The mixture is blended until substantially homogeneous and screened through a coarse sieve to break up any agglomerates. A 545 g quantity of the mix is pressed at 2700 psi to form a plate having the same dimensions as that prepared in Example 1, and the plate is placed in an oven at room temperature and heated to 150°C over a period of about 24 hours at a rate of temperature rise of about 5°C/hr, to set and cure the resin. The resulting green body has a specific gravity of 1.73.

The piece is siliconized in accordance with the method and conditions set forth in Example 1, employing 282 g of silicon, the binder carbonizing during the heating before the silicon melts. Upon infiltration of the piece by the molten silicon, the silicon reacts with the powdered graphite, the residual carbon from the binder, and some of the boron carbide, to produce silicon carbide.

The resulting plate has a specific gravity of 2.57, a modulus of rupture of 34,700 psi (2400 kg/sq cm) and a modulus of elasticity of 51.2 × $10^6$ psi (3.6 × $10^6$ kg/sq cm), and is extremely hard and essentially nonporous. Anal.: total C, 16.5 percent; total Si, 32.6 percent, total B (diff.), 50.9 percent; free C, 0.16 percent; free Si, 12.6 percent.

EXAMPLE 5

A mixture is prepared consisting of 40 parts of 120 grit boron carbide, 30 parts of 180 grit boron carbide, 10 parts of 400 grit boron carbide, 20 parts of powdered graphite with a particle size of about 50 microns and smaller, and 10 parts of the same carbonizable binder employed in Example 4. The mixture is blended until substantially homogeneous and screened through a coarse sieve to break up any agglomerates. A 490 g quantity of the mix is pressed at 3000 psi to form a plate having the same dimensions as that prepared in Example 1, and the plate is placed in an oven at room temperature and heated to 150°C over a 24 hour period at a rate of temperature rise of about 5°C/hr to set and cure the resin. The resulting green body has a specific gravity of 1.55.

The piece is siliconized in accordance with the method and conditions of Example 1, employing 320 g of silicon, the binder carbonizing during the heating.

The resulting plate has a specific gravity of 2.72, and is extremely hard and essentilaly nonporous. Anal.: total C, 22.5 percent; total Si, 39.1 percent; total B (diff.), 34.8 percent; free C, 0.71 percent; free Si, 6.9 percent.

Knoop 100 hardness determinations on the boron carbide, silicon carbide and silicon present in the bodies of this invention give values of about 2850–3000, 2500–2700 and 700–1600 kg/mm sq, respectively, the value for silicon being somewhat higher than the expected value of 700–900, possibly due to small amounts of boron being present in the silicon. Since the silicon phase is considerably softer than the boron carbide and silicon carbide, it is usually preferred to produce bodies containing the minimum amount of free silicon consistent with obtaining a sound, uncracked body, when hard bodies suitable for use as armor are desired. Several interrelated process variables must be considered in this connection, including the particle size of the boron carbide in the initial mixture and the presence of carbon in the green body being siliconized.

The particle size of the granular boron carbide is conveniently expressed as grit size, each grit size number designating the approximate range of particle sizes set forth in Table I.

TABLE I

Typical Particle Size Distribution of Boron Carbide Abrasive Grits

| Grit No. | Microns: Average | Maximum | Minimum |
|---|---|---|---|
| 16 | 1092 | 1650 | 787 |
| 36 | 483 | 762 | 305 |
| 54 | 305 | 495 | 203 |
| 70 | 203 | 330 | 127 |
| 120 | 102 | 165 | 50 |
| 180 | 76 | 114 | 25 |
| 400 | 22 | 45 | 11 |
| 800 | 12 | 30 | 5 |

Dense boron carbide-silicon carbide-silicon bodies may be prepared by the method of the invention from an initial mixture containing boron carbide grain of a single, uniform particle size. It is usually disadvantageous to do so, however, because green bodies formed with particles of uniform size have considerably more interstitial space unoccupied by boron carbide than bodies formed with particles of varying sizes, and therefore tend to have a comparatively high free silicon content after siliconization. It is therefore almost always preferred, and is essential for producing highly effective armor, to employ a variety of boron carbide grit sizes in preparing the initial mixture, as in Examples 1–5, the variety being such as to permit dense packing and result in a green body having comparatively little interstitial space between the boron carbide particles. A combination of about 70 percent of relatively coarse grit and about 30 percent of relatively fine grit is usually suitable, at least as a starting point for further refinements which may be introduced on the basis of experimental determinations of the optimum combination for the intended purpose. Thus the granular boron carbide of Example 1 consists of 70 percent relatively coarse (180 and 400) grit and 30 percent relatively fine (800) grit; the granular boron carbide of Example 2 consists of 70 percent 120 and 180 grit and 30 percent 400 and 800 grit; the granular boron carbide of Example 3 consists of 70 percent 16, 36, 54 and 70 grit and 30 percent 180 and 400 grit; and the granular boron carbide of Example 4 consists of about 69 percent 120 and 180 grit and about 31 percent 800 grit. It should be noted that the terms relatively coarse and relatively fine refer to the relationship between the particle sizes present in a given initial mixture, and any numerically designated grit size will be relatively coarse or relatively fine, depending upon the other grit sizes present.

From a standpoint of producing siliconized bodies of maximum strength and hardness and which are highly effective as armor, it is essential that the granular boron carbide in the initial mixture have a maximum particle size of about 300 microns or less, although coarser material may be employed to make composite bodies useful for less demanding purposes. The maximum boron carbide particle size in Example 1 is about 114 microns (180 grit) and most of the boron carbide is considerably finer, this mixture having the smallest maximum particle size illustrated by the examples; and plates produced as in Example 1 prove to be highly effective as armor when subjected to rigorous, controlled ballistic tests which involve firing projectiles of selected sizes with controlled velocities at the center of the plates. From a practical standpoint, however, there is a limit to how fine the boron carbide grain may be, since as the particle size of the boron carbide is decreased its reactivity with the silicon during the siliconization increases, and it becomes increasingly difficult to control the siliconization and prevent cracking of the bodies which occurs, apparently as a result of a rapid and extensive reaction. In fact, it is difficult to produce sound, intact bodies consistently when using the 180-400-800 grit mixture employed in Example 1. For this practical reason, it is usually preferred to employ at least some granular boron carbide which is coarser than 180 grit. While the use of such coarser material tends to result in an increase in the volume of interstitial space in the green body and therefore an increase in the amount of free silicon in the siliconized body, this tendency twoard an increase in the amount of free silicon can be at least partially offset by the presence of carbon in the green body at the time it is siliconized, which may be achieved by the incorporation of carbon and/or a carbonizable binder in the initial mixture.

Comparing Examples 1 and 2 in this light, it is seen that the free silicon content of the bodies produced is substantially the same, notwithstanding the inclusion of some 120 grit boron carbide in the initial mixture of Example 2, in which a carbonizable binder is also incorporated. As the green body of Example 2 is heated and the binder is carbonized, carbon is produced in the interstices between the boron carbide grains; and upon infiltration the molten silicon reacts with the carbon, as well as with the boron carbide, to produce silicon carbide, thus reducing the volume of interstitial space available for occupancy by free silicon. The body produced in Example 2 is comparable to that of Example 1 as armor in controlled ballistic tests, and the modulus of rupture and modulus of elasticity of the bodies of Examples 1 and 2 are about the same.

Comparing Example 2 with Example 3, in which a substantial amount of boron carbide grain larger than 300 microns is used in the initial mixture, it may be seen that the modulus of rupture and modulus of elasticity are markedly lower for the body produced in Example 3 although the free silicon content of the bodies of both examples is about the same, a carbonizable binder being employed in both examples. Ballistic tests on bodies prepared as in Example 3 show that they are clearly inferior to bodies prepared as in Example 2, although useful as armor for protection against low velocity, low caliber projectiles. Accordingly, it is usually preferred to exclude from the initial mixture any substantial amount of boron carbide with a particle size of more than about 300 microns.

Example 4 illustrates a particularly preferred and highly desirable initial mixture for the production of composite bodies according to the invention. It will be noted that the maximum particle size of the granular boron carbide is well below 300 microns, but that some of the boron carbide is coarser than 180 grit. In addition to employing a carbonizable binder to provide for the presence of carbon in the green body at the time the silicon infiltrates, carbon in the form of powdered graphite is incorporated in the initial mixture to aid in minimizing the amount of free silicon in the body after siliconization. The composite body produced in Example 4 contains considerably less free silicon than the body of Example 1, and has superior mechanical properties. Ballistic tests show that the composite body of Example 4 is as good as or better than that of Example 1 for use as armor, and the initial mixture of Example 4 is preferred because composite bodies produced therefrom are, by virtue of the incorporation of boron carbide larger than 180 grit in the initial mixture, much less subject to cracking during or following siliconization. Yields of 80–90 percent are attainable using the process of Example 4; i.e. sound, crack-free siliconized bodies are obtained in about eight or nine out of ten runs.

Considering Example 5, it is seen that by incorporating a comparatively large amount of carbon in the initial mixture, the amount of free silicon in composite bodies of the invention may be reduced to a rather low level, 6.9 percent in this example. Bodies containing as little as about 3 percent free silicon can be produced by suitably adjusting the boron carbide grit sizes and the amounts of carbon and carbonizable binder in the initial mixture and optimizing the specific gravity of the coherent green body. It will also be noted that the specific gravity of the composite body produced in Example 5 is somewhat higher than the specific gravity of bodies of higher free silicon content produced according to Examples 1–4. This is to be expected, since silicon has a relatively low specific gravity of 2.33 as compared to boron carbide and silicon carbide with specific gravities of 2.5 and 3.2, respectively.

It is difficult, however, to consistently produce sound composite bodies having such a low content of free silicon unless the bodies are comparatively small, for reasons which are not entirely clear. Attempts to repeat Example 5 often result in cracked bodies, and the problem becomes worse as the size of the body sought to be made is increased. It may be conjectured that the cracking is due, at least in part, to stresses developed as a result of the expansion which occurs when the carbon reacts with silicon to form silicon carbide. In any event, it appears that about 3 percent free silicon is the approximate practically attainable minimum.

Even though composite bodies of such low silicon content may be produced and are highly effective as armor, the practical difficulty of achieving good yields makes it commercially preferable to produce bodies containing at least about 10 percent silicon. Bodies prepared according to Example 4, which describes a more or less optimum compromise in respect to the numerous variables involved in the process of the invention, usually contain from about 12 percent to about 16 percent free silicon.

Summarizing the foregoing, the initial mixture to be used in producing composite bodies of the invention may comprise granular boron carbide of a single, uniform particle size but preferably contains boron carbide with a variety of particle sizes, the variety preferably being such as to permit dense packing and leave a minimum of interstitial space when the initial mixture is formed into the desired shape. Further, it is preferred that the boron carbide have a maximum particle size of about 300 microns or less, and that it contain some grain which is coarser than 180 grit. The initial mixture advantageously contains a carbonizable temporary binder or carbon, and preferably contains both.

The temporary binder may be selected from among a wide variety of materials recognized as suitable for such use, for example, polyethylene glycols and methoxypolyethylene glycols such as those sold by Union Carbide Corporation under the trade name CARBOWAX, polyvinyl alcohol, and where a carbonizable binder is desired, phenolformaldehyde resins, epoxy resins, dextrine and the like.

The binder is employed in an amount sufficient to give an initial mixture which is of the proper consistency for forming into the desired shape by the method to be employed. Even if the binder is of the carbonizable type this amount is usually established without regard to the amount of carbon present therein, since finely divided carbon can be incorporated in the initial mixture in an amount sufficient to provide the total quantity of carbon desired in the green body at the time of siliconization. However, it is usually preferred that the carbonizable binder have a high carbon content so that as much of the carbon in the body as possible comes from this source, such carbon generally being more finely divided and dispersed than the carbon added to the mix. The carbon added to the mix may be graphite, such as employed in the examples, or another type of free carbon.

For any given initial mixture of granular boron carbide and binder, the optimum amount of carbon to produce a composite body having the desired properties is best determined experimentally. Calculations based upon the comparative specific gravities of the unsiliconized and siliconized bodies and the computed interstitial volumes thereof do not afford a meaningful guide because the silicon reacts not only with the carbon, but with the boron carbide as well, and the extent of the latter reaction and effect thereof is not precisely predictable. Generally, the optimum amount of carbon is that which will give good yields of siliconized bodies which are sound and not subject to cracking, and of minimum free silicon content consistent therewith. An excess of carbon tends to result in cracked bodies, presumably due to the expansion which accompanies the conversion of carbon to silicon carbide, while an insufficiency of carbon tends to result in a higher free silicon content in the composite body. The graphite in the desirable initial mixture of Example 4, present in an amount of about 2 percent of boron carbide-graphite portion of the mix, approaches the optimum amount for the mix described, since an increase to 3 percent usually results in cracking during siliconization, while a decrease tends to result in a higher free silicon content and correspondingly inferior properties in the composite body.

After the ingredients of the initial mixture have been blended together and, if necessary, passed through a coarse screen to break up any agglomerates, the mixture is formed into the desired shape and the binder is set to produce a coherent green body. porosity. and the Various methods may be employed to shape the mix. In general, the mechanical properties of the composite bodies tend to improve as the specific gravity of the green body is increased, and shaped mixes of maximum specific gravity and minimum interstitial space are therefore usually preferred, subject, however, to the limitation that there must be a continuous interconnected network of interstitial space between the boron carbide grains throughout the green body to permit the infiltration of silicon. In practice this limitation is of little significance because it would require extreme and specialized measures to attain such close packing and high specific gravity in the shaped mix as to present a problem of insufficient porisity. Even when the initial mixture is pressed into the shape of a plate at pressures up to 3000 psi as in the examples, the specific gravity of the green body is only about 70 percent of the theoretical specific gravity, andthe green bodies are sufficiently porous.

When employing the desirable initial mixture of Example 4 to form flat plates by pressing, it is usually preferred to use a pressure of about 2500–3000 psi, a green body having a specific gravity of about 1.70–1.76 being obtained upon setting the binder. Pressures less than about 2500 psi tend to result in a lower specific gravity, more porosity in the green body, and a higher silicon content after siliconization, while pressures considerably in excess of 3000 psi appear to give no further densification. When other initial mixtures are employed, the optimum pressure varies to some extent with the particle size of the boron carbide, somewhat less pressure being required to attain a given specific gravity as the particle size decreases. The amount of initial mixture employed will, of course, depend upon the volume and specific gravity of the shaped mix.

Although the examples illustrate shaping of the initial mixture only by pressing, various other methods such as extrusion, slip casting and investment casting may be used, and the method of choice will depend primarily upon the shape desired. The composition of the initial mixture may be varied, especially in respect of the binder, to obtain the most suitable mix for the particular method of forming employed.

For investment casting and slip casting a particularly desirable initial mixture is substantially the same as that described in Example 4 except for the binder, and consists of 45 parts of 120 grit boron carbide, 23 parts of 180 grit boron carbide, 30 parts of 800 grit boron carbide, 2 parts of powdered graphite, and 50 parts of a 4 percent solution of dextrine in water. Preferably a small quantity of a viscosity-lowering agent is incorporated to render the mix more flowable, for example, a polyelectrolyte such as the one sold by R. T. Vanderbilt Company under the trade name DARVAN 7. Casting techniques are well-known and accordingly not described here in detail. In investment casting a porous mold with a cavity of suitable configuration to produce the desired shape is filled with the mix, preferably with vibration to aid packing of the particles. The filled mold is allowed to stand until sufficient aqueous phase has been absorbed from the mixture into the porous mold to permit the body to be handled. The body may then be removed from the mold and the binder set. Using the above-mentioned mixture, coherent green bodies having a preferred specific gravity of about 1.7 may be obtained by investment casting in intricate shapes such as helmets, leg armor sections, vest sections, etc., which bodies may then be heated to carbonize the binder and siliconized to produce composite bodies according to the invention which may be used as armor or for numerous other purposes.

Another particularly useful embodiment of the invention involves forming the initial mixture by extrusion. It is well-known that boron carbide is of limited utility as an abrasive because the grain tends to fracture conchoidally and thus become rounded and less abrasive as wear occurs during use. However, an initial mixture according to the present invention may be extruded to form a fine strand, which may be cut into short lengths and the binder therein set to produce grain which may be siliconized to obtain boron carbide-silicon carbide-silicon abrasive grain. It has been found that such grain, even though containing a substantial amount of boron carbide, nonetheless fractures in use in such a way as to leave new, sharp, abrasive edges exposed, such grain therefore being well suited to use in abrasive articles.

When the mixture has been formed into the desired shape, the binder is set to obtain a coherent green body under conditions suited to the particular binder employed. Usually a slow heating cycle such as used in the examples is appropriate, the temperature being increased gradually to permit dissipation of the volatiles without cracks forming in the body. When a phenol-formaldehyde or other resin is employed, setting the binder may also involve curing the resin, whereas with solutions of polyvinyl alcohol, dextrine and the like, setting the binder primarily involves evaporation of the solvent.

When a carbonizable binder is employed, the binder in the coherent green body may be carbonized by heating the body in an inert atmosphere to a sufficiently high temperature to effect carbonization. Since volatiles are dissipated from the body during carbonization, it may be necessary or desirable to control the carbinizing heating cycle by providing for a slow rate of temperature increase to permit the escape of volatiles without cracking the body. The need for such control tends to increase with increasing size and thickness of the body. As may be seen from the examples, no specific temperature control is required under the conditions there set forth for bodies of the described dimensions; and while carbonization may, if desired, be carried out as a separate step, it may often conveniently be accomplished during the siliconizing heating cycle.

Siliconization of the green body is carried out by heating it, in an inert atmosphere and in contact with a controlled amount of silicon, to a siliconizing temperature above the melting point of silicon and at least about 1500°C, at which temperature the molten silicon infiltrates the body and reacts with some of the boron carbide and with substantially all of the carbon present, if any, producing silicon carbide in situ. The siliconization is conveniently carried out as described in the examples, by placing the green body in a suitable crucible in a suitable furnace with the requisite amount of granular silicon spread on top of the body. A piece of carbon cloth, conveniently carbonized burlap, may be placed between the crucible and the piece to be siliconized to minimize any tendency for the piece to adhere to the crucible.

The amount of silicon employed must be carefully controlled within rather narrow limits to obtain sound, uncracked composite bodies having optimum properties for use as armor, this control being necessary to prevent the reaction of boron carbide and silicon from proceeding to an undesirable extent. Since the tendency for this reaction to proceed depends largely upon the particle size of the boron carbide, the degree of control over the amount of silicon must, in general, be greater as the boron carbide particle size is decreased. However, since it is usually preferred to employ at least some rather fine boron carbide in the mix in order to produce bodies of superior properties, the amount of silicon used must usually be carefully regulated.

The amount of silicon to be used to a given green body ordinarily cannot be calculated with exactitude since it is difficult to predict how much silicon will react with the boron carbide and how much will be present in the siliconized body as free silicon. However, a reasonably close approximation of the requisite amount of silicon can be made by subtracting the measured specific gravity of the coherent green body from the approximate desired specific gravity of the siliconized body and multiplying by the volume of the body, thus computing the amount of silicon needed to give the desired weight increase, assuming as is true that there is no appreciable change in the dimensions of the green body upon siliconization. If carbon cloth is employed, it will generally react stoichiometrically with the silicon to form silicon carbide, and the additional amount of silicon required for this purpose can be calculated quite accurately. The precise optimum amount of silicon is best determined experimentally for a green body of given dimensions and composition, using the calculated approximation as a starting point which is subject to modification, to obtain a sound, essentially nonporous composite body of the desired specific gravity. The body is preferably free of any excess silicon on its surface, thus requiring no polishing prior to use. Preferably there is no adhesion of the body to the crucible, or to the carbon cloth if one is employed.

A small excess or deficiency of silicon can seriously affect the course of the siliconization. Excess silicon gives rise to an increased tendency of the body to crack, probably due at least in part to an unduly extensive reaction with the boron carbide, and possible due to certain surface effects of the excess silicon resulting in a nonuniform body having variable coefficients of thermal expansion. A deficiency of silicon results in a body of greater porosity, disadvantageous for armor, and may result in a cracked body. In Example 2, where 295 g of silicon is employed, it is found that sound, uncracked bodies are produced only if the total amount of silicon is no less than about 270 g and no more than about 320 g.

It is desirable for the molten silicon to contact the piece as uniformly as possible, since a substantial localized excess tends to result in cracks at that location. Little difficulty is had in siliconizing a substantially flat piece, the granular silicon merely being placed on top of the piece where, upon reaching the melting point, it melts and covers the surface. Bodies of more complex shapes such as cylinders may be wrapped with a porous wick material such as carbon cloth, placed in the crucible on another piece of carbon cloth, and surrounded with the proper amount of granular silicon so that upon melting the silicon is drawn up by the wick, contacts the green body quite uniformly, and infiltrates the body when a sufficiently high temperature is reached.

Siliconization must be carried out in an inert atmosphere such as vacuum or an inert gas, e.g. argon, helium or the like. Nitrogen is not suitable because it tends to react with the boron carbide at the temperatures reached to form a coating of boron nitride on the piece, which coating impedes infiltration of the silicon. Vacuum is much preferred, and the higher the better, since it aids in the removal of any air trapped within the piece. High vacuum permits infiltration of the silicon at temperatures as low as about 1500°C, and a temperature of about 1600°C is required at a pressure of about 50 microns. In an atmosphere such as argon or helium at atmospheric pressure, a somewhat higher siliconizing temperature of about 1850°C is usually required, this higher temperature being less desirable as a result of increased reactivity of the boron carbide with concomitant greater difficulty in controlling the siliconization to give a sound, uncracked composite body. It is usually found that while inert atmospheres other than vacuum are suitable for smaller pieces, increasing difficulty is experienced due to localized siliconization and cracking as the size of the body is increased.

When heated to about 2200°C, it appears that a phase change occurs in the body, accompanied by melting and deformation. Furthermore, molten silicon will tend to evaporate rapidly under vacuum at temperatures well below 2200°C. Thus 2200°C represents the highest practicable temperature for siliconization, and preferably the lowest possible temperature is used in order to minimize the rate of reaction of the boron carbide with the silicon.

It is apparent that various suitable types of furnaces may be used instead of the induction furnace of the examples. The rate of temperature rise below the melting point of silicon is not especially important except as regards carbonization of the binder as discussed above. When the silicon has melted, however, it is desirable that the temperature increase as rapidly as possible to that at which infiltration occurs, to minimize any effects which the molten silicon might have on the surface of the piece; and once infiltration has occurred, it is desirable to avoid any further temperature increase and to allow the piece to cool as rapidly as possible without causing cracking due to thermal shock to minimize the extent of the reaction between the boron carbide and silicon and thereby minimize the tendency of the body to crack.

The composition and structure of the composite bodies of the invention appear to be complex. X-ray diffraction analysis of the bodies produced in Examples 2-5 indicates that each body contains the same five phases as reported for the body of Example 1, and bodies produced in accordance with the invention invariably appear to consist essentially of boron carbide, silicon carbide and free silicon. It has been observed, however, that composite bodies siliconized at temperatures of about 1850°C usually have X-ray diffraction patterns which indicate that the bodies contain no beta-silicon carbide, only the alpha form being present, whereas bodies siliconized at about 1600°C usually appear to contain both forms of silicon carbide. The two boron carbide types invariably appear to be present, both having a boron carbide type rhombohedral structure, one of which types corresponds to $B_4C$, the other having an expanded lattice and being of less determinate composition but containing at least boron and carbon and possibly containing some silicon. There is some indication that the free silicon may, at least in some cases, contain minor amounts of boron. Minor impurities, such as iron and calcium which may be present in the granular silicon or boron carbide employed, may also be present in the composite body.

The silicon carbide and boron carbide are present as mutually adherent grains in the composite body, presumably as a result of the reaction whereby silicon carbide is formed from the boron carbide. When free silicon is present in amounts up to about 15 percent, it appears as a discontinuous phase, filling the interstices between the boron carbide and silicon carbide; when present in amounts of about 15 percent or more, it appears as a continuous phase which further bonds the boron carbide and silicon carbide. It is usually found that the modulus of rupture is somewhat lower in bodies containing more than about 15 percent free silicon than in bodies containing less than about 15% thereof. As noted above, 3 percent silicon appears to be about the minimum attainable and amounts of at least about 10 percent are preferred. While there is no specific upper limit to the free silicon content of the composite bodies, and bodies containing considerably more than 35 percent are easily produced, it is usually preferred that the silicon content be no more than about 25 percent if highly effective armor is desired. Bodies containing from about 10 percent to about 25 percent of free silicon usually contain from about 50 percent to about 80 percent boron carbide and from about 10 percent to about 25 percent silicon carbide.

The composite bodies of the invention are essentially nonporous. Their specific gravity is generally within the range from about 2.5 to about 2.75, but for armor it is usually preferred that the specific gravity range from about 2.5 to about 2.6 since such composite bodies have the advantage of being lighter in weight while equally effective as armor. The modulus of rupture may be as low as about 10,000 psi (700 kg/sq cm), especially when granular boron carbide with a particle size greater than about 300 microns is included in the mix, but may be as high as about 37,000 psi (2600 kg/sq cm) or more and is preferably at least about 20,000 psi (1400 kg/sq cm) for use as armor. The modulus of elasticity usually ranges from a low of about $30 \times 10^6$ psi ($2.1 \times 10^6$ kg/sq cm), especially when granular boron carbide with a particle size greater than about 300 microns is included in the mix, to a high of about $60 \times 10^6$ psi ($4.2 \times 10^6$ kg/sq cm), and preferably is at least about $45 \times 10^6$ psi ($3.1 \times 10^6$ kg/sq cm).

The composite bodies of the invention are virtually insoluble in dilute or concentrated hydrochloric, sulfuric or nitric acid, but may show slight weight loss in a hot 50 percent sodium hydroxide solution after 24 hours. At 1350°C, bodies prepared in accordance with Example 4 show good oxidation resistance and only about 10 percent reduction of their modulus of elasticity.

Except as otherwise specified, all references herein to percentages and to parts refer, respectively, to percentages and parts by weight; and references to microns or millimeters in describing pressure and vacuum refer to microns or millimeters of mercury. Except as otherwise specified, modulus of rupture determinations are made by the four point loading system, and modulus of elasticity determinations are made by the sonic method.

We claim:

1. A dense, composite ceramic body consisting essentially of from about 50 percent to about 80 percent boron carbide, from about 10 percent to about 45 percent silicon carbide, and from about 3 percent to about 35 percent free silicon.

2. A body as defined in claim 1 containing from about 10 percent to about 25 percent free silicon.

3. A body as defined in claim 2 containing from about 10 percent to about 25 percent silicon carbide.

4. A dense, composite ceramic body as defined in claim 1 which, by x-ray diffraction analysis, consists essentially of $B_4C$, a boron carbide type having an expanded lattice, silicon carbide of the alpha form or the alpha and beta forms, and free silicon.

5. A body as defined in claim 4 wherein said silicon carbide is present in an amount of from about 10 percent to about 25 percent and in both the alpha and beta forms, and said free silicon is present in an amount from about 10 percent to about 25 percent.

6. Ceramic armor formed of bodies as defined in claim 5, said bodies having a specific gravity from about 2.5 to about 2.6 a modulus of rupture from about 20,000 psi to more than about 37,000 psi, and a modulus of elasticity from about $45 \times 10^6$ psi to about $60 \times 10^6$ psi.

7. Abrasive grain consisting essentially of bodies as set forth in claim 1, said bodies being granular.

8. Ceramic armor formed of bodies as defined in claim 1.

* * * * *